United States Patent [19]

Nohira et al.

[11] 4,161,929

[45] Jul. 24, 1979

[54] EXHAUST GAS RECIRCULATION CONTROL SYSTEM FOR AN INTERNAL COMBUSTION ENGINE

[75] Inventors: Hidetaka Nohira, Mishima; Kiyoshi Kobashi, Susono; Jiro Nakano, Toyota, all of Japan

[73] Assignee: Toyota Jidosha Kogyo Kabushiki Kaisha, Japan

[21] Appl. No.: 847,434

[22] Filed: Nov. 1, 1977

[30] Foreign Application Priority Data

Aug. 30, 1977 [JP] Japan .................................. 52-103953

[51] Int. Cl.$^2$ ............................................. F02M 25/06
[52] U.S. Cl. ................................................. 123/119 A
[58] Field of Search ..................................... 123/119 A

[56] References Cited

U.S. PATENT DOCUMENTS

| | | | |
|---|---|---|---|
| 3,915,134 | 10/1975 | Young et al. | 123/119 A |
| 3,963,011 | 6/1976 | Saito et al. | 123/119 A |
| 3,969,614 | 7/1976 | Moyer et al. | 123/119 A X |
| 3,982,395 | 9/1976 | Hasegawa et al. | 123/119 A |
| 4,044,738 | 8/1977 | Williams et al. | 123/119 A |
| 4,052,968 | 10/1977 | Hattori et al. | 123/119 A |

*Primary Examiner*—Wendell E. Burns
*Attorney, Agent, or Firm*—Stevens, Davis, Miller & Mosher

[57] ABSTRACT

An exhaust gas recirculation control system for an internal combustion engine including a diaphragm type exhaust gas recirculation control valve provided at a middle portion of a passage for conducting exhaust gases to be recirculated, the control valve being controlled by the fluid pressure supplied to its diaphragm chamber, wherein the fluid pressure is controlled to accord with a target value prepared to provide the optimum exhaust gas recirculation in various operating conditions of the engine and selected in accordance wtih the current operating conditions of the engine.

9 Claims, 7 Drawing Figures

EXHAUST GAS

EXHAUST GAS

EXHAUST GAS RECIRCULATION CONTROL SYSTEM FOR AN INTERNAL COMBUSTION ENGINE

BACKGROUND OF THE INVENTION

The present invention relates to exhaust gas recirculation effected in internal combustion engines for the purpose of controlling emission of noxious components in exhaust gases from the engine, and, more particularly, to an exhaust gas recirculation control system for controlling the exhaust gas recirculation.

When exhaust gas recirculation is effected in an internal combustion engine, it is important that the amount of exhaust gases recirculated is properly controlled in accordance with operating conditions of the engine, so that the requirement for controlling emission of noxious components is balanced against the requirement for good performance of the engine or the vehicle which mounts the engine.

As an exhaust gas recirculation control system, there has been proposed a system which includes a memory means for electronically retaining target values of the flow of exhaust gases recirculated to provide the optimum exhaust gas recirculation in various operating conditions of the engine expressed by various combinations of conditions selected from rotational speed, amount of intake air and intake manifold vacuum of the engine and a control means which reads out a target value for the flow of recirculating exhaust gases from said memory means in accordance with current values of the parameters selected for expressing the operating condition of the engine, compares the read-out target value with the current flow of recirculating exhaust gases and controls an exhaust gas recirculation control valve so as to accord the flow of recirculating exhaust gases to the read-out target value. In conventional systems of this type, amount of shifting of the valve stem of the exhaust gas recirculation control valve, amount of opening of the butterfly valve of a butterfly type exhaust gas recirculation control valve, intake manifold vacuum of the engine operating under the exhaust gas recirculation, or the exhaust gas recirculation ratio is employed as the target value to be retained in the memory means.

Therefore, in a control system of the aformentioned type, it is required that the same quantity as the target values retained in the memory means should be detected from the currently operating engine, for comparison purposes. Therefore, when the amount of shifting of the valve stem of the exhaust gas recirculation control valve is selected as the quantity of which target values are memorized, a displacement detecting means such as a difference transformer for detecting linear shifting of the valve stem is required. However, since a diaphragm type control valve is generally employed as the exhaust gas recirculation control valve, the stroke of the valve stem is relatively small and requires a high accuracy detecting means. However, the use of a high accuracy detecting means in the automobile causes various problems such as vibration of the valve stem, thermal effects, etc. The butterfly type exhaust gas recirculation control valve has a feature that the flow change rate relative to the rotation of the butterfly valve becomes very large in the small-opening region, and it is difficult to adapt the control system to this particular characteristic. If the intake manifold vacuum of the engine is employed as the quantity of which the target values are memorized, the rotational speed and the amount of intake air must be employed as the parameters for expressing operational condition of the engine. A rotational speed sensor for detecting the rotational speed of the engine over a wide range from low to high speed ranges in high accuracy is currently available in various types. However, a sensor for detecting the amount of intake air in the engine at high accuracy, particularly in the low flow range, is currently not available. When the ratio of exhaust gas recirculation is employed as the quantity of which the target values are memorized, a complicated data processing system is required.

SUMMARY OF THE INVENTION

It is the object of the present invention to provide an improved exhaust gas recirculation control system for an internal combustion engine by employing values of the fluid pressure for controlling a diaphragm type exhaust gas recirculation control valve as the target values retained in the memory means and read out therefrom and compared with the actual values of said fluid pressure so as to effect a feed-back control which accords said fluid pressure to the read-out target values.

By employing the fluid pressure for controlling a diaphragm type exhaust gas recirculation control valve as the target values for control, high accuracy control of the exhaust gas recirculation control valve is available by employing control elements of reasonable accuracy and cost. In this case, the control of said fluid pressure for controlling a diaphragm type exhaust gas recirculation control valve is accomplished in the most desirable manner when a digitally operating pressure control valve is employed.

BRIEF DESCRIPTION OF THE DRAWING

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENT

Figure 1:
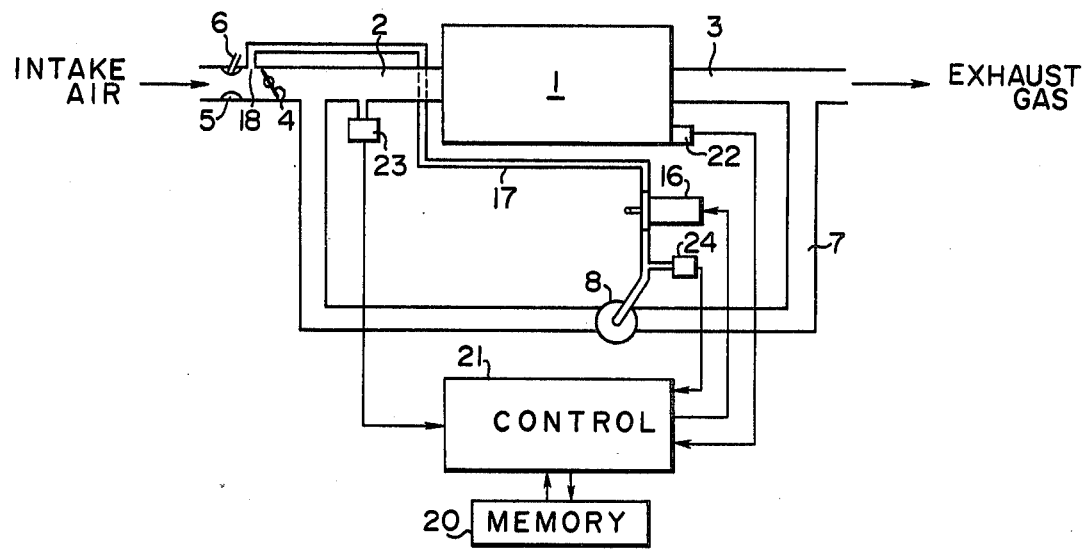
FIG. 1 is a diagram showing an embodiment of the exhaust gas recirculation control system of the present invention incorporated in an internal combustion engine.

Referring to FIG. 1, an internal combustion engine diagrammatically shown by a block 1 takes in fuel-air mixture through an intake manifold 2 and discharges exhaust gases through an exhaust manifold 3. Upstream of the intake manifold is provided a carburetor including a throttle valve 4, a venturi portion 5 and a main fuel nozzle 6 opening at the throat of the venturi portion. A passage 7 connecting the intake and the exhaust manifolds 2 and 3 provides an exhaust gas recirculation system for recirculating a part of the exhaust gases to the intake manifold of the engine. An exhaust gas recirculation control valve 8 is provided at a middle portion of the passage 7.

Figure 2:
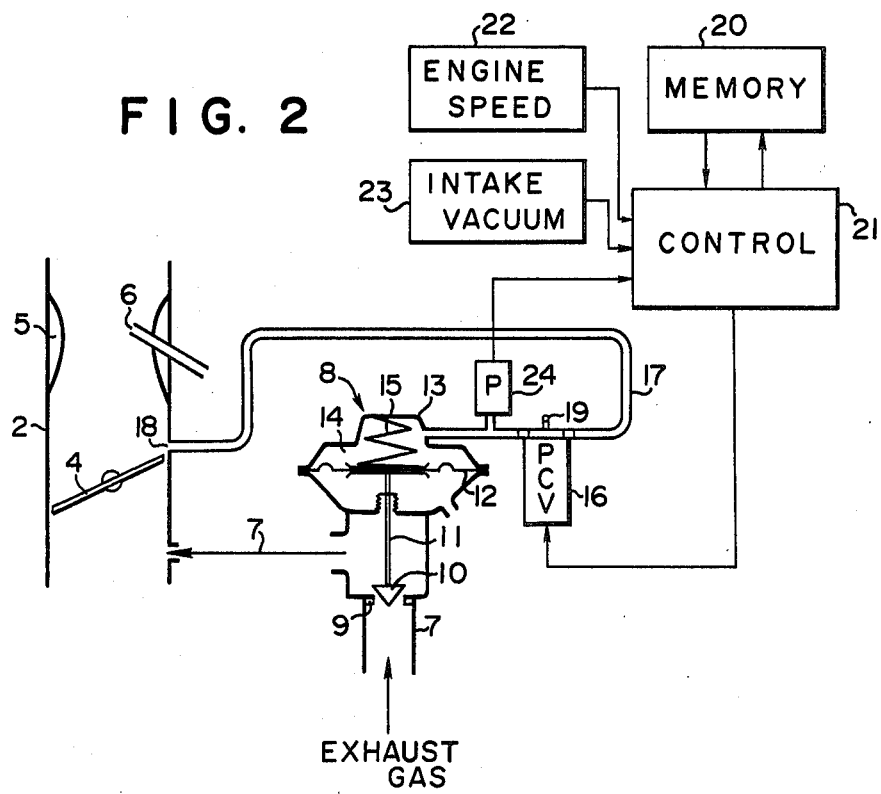
FIG. 2 is a diagrammatical illustration of the exhaust gas recirculation control system shown in FIG. 1.

The exhaust gas recirculation control valve 8 is a diaphragm type control valve having a structure as shown in FIG. 2 and is adapted to control the passage 7 in a manner to open or close an orifice port 9 provided at a middle portion of the passage 7 by a valve element 10 supported by a stem 11 which is shifted up and down in the figure by a diaphragm 12 mounted in a casing 13 of a diaphragm means. The diaphragm 12 is biased downward in the figure by a compression coil spring 15 and is shifted upward in the figure by the vacuum supplied to a diaphragm chamber 14. The diaphragm chamber 14 is connected with a port 18 by a conduit 17, the port 18 being provided to open toward the intake passage of the carburetor at a position which is located upstream of the throttle valve 4 when it is fully closed and is located downstream of the throttle valve when it is slightly opened from its fully closed position. The port 18 is an intake vacuum take-out port of a well-known sort which provides intake vacuum only when the throttle valve is opened while it provides atmospheric pressure during idling operation or deceleration of the engine. However, as a matter of course, the port 18 provides substantially atmospheric pressure when the throttle valve is fully opened in high load operation, since in this condition the intake vacuum itself substantially decreases.

A pressure control valve 16 is provided at a middle portion of the vacuum conduit 17. This valve may be a conventional pressure control valve of the electromagnetic type and is adapted to connect the diaphragm chamber 14 to the vacuum port 18 when energized and to connect the diaphragm chamber 14 to the atmosphere through a bleed port 19 when de-energized. Control of the valve 16 is performed by a control means 21 associated with a memory means 20, a rotational speed sensor 22 for detecting the rotational speed of the engine, and a vacuum sensor 23 for detecting the value of the intake manifold vacuum of the engine.

The memory means 20 may be a programmable read-only memory and retains target values of the fluid pressure supplied to the diaphragm chamber 14 which provide the optimum exhaust gas recirculation in various operating conditions of the engine expressed by the combination of the rotational speed and the amount of intake air of the engine. If the optimum exhaust gas recirculation ratio is determined with respect to various operating conditions of the engine, the opening of the exhaust gas recirculation control valve 8 is determined, and accordingly the value of the fluid pressure to be supplied to the diaphragm chamber 14 is determined. The memory means 20 retains the various values for the fluid pressure to be supplied to the diaphragm chamber 14 which have been obtained from experiments with regard to actual engines in various operating conditions of the engine expressed by the combination of the rotational speed and the amount of intake air of the engine. The target values are retained digitally.

The control means 21 includes a target value read-out means such as a microprocessor which reads out a particular target value for the fluid pressure supplied to the diaphragm chamber 14 which will provide the optimum value of exhaust gas recirculation in the current operating condition of the engine, as expressed by the combination of the current rotational speed of the engine detected by the sensor 22 and the current amount of intake air of the engine detected by the sensor 23, a comparing means which compares the actual value of the fluid pressure detected by a pressure sensor 24 with the abovementioned particular target value, and an output means which delivers an electrical output signal for operating the pressure control valve 16 in accordance with the result of the abovementioned comparison. The pressure sensor 24 may be provided at a middle portion of the vacuum conduit 17.

Assuming that the engine is operating in a certain under-load condition, the rotational speed and the intake manifold vacuum of the engine in that operating condition are detected by the sesnsors 22 and 23, respectively. The signals dispatched from the sensors 22 and 23 expressing respectively the rotational speed and the intake manifold vacuum of the engine are supplied to the control means 21 and are processed therein to cause read-out of a particular target value for the fluid pressure supplied to the diaphragm chamber 14 from the memory means 20. The read-out target value is compared with the actual value of the fluid pressure supplied to the diaphragm chamber 14 and detected by the pressure sensor 24. If the actual value of said fluid pressure is smaller than the target value (this means that the absolute value of the difference from atmospheric pressure of the actual fluid pressure is smaller than that of the target value) the control means 21 delivers an electronic output signal to the pressure control vlave 16 so as to operate the pressure control valve to transmit the intake manifold vacuum provided by the port 18 to the diaphragm chamber 14. Therefore, the valve element 10 of the exhaust gas recirculation control valve 8 is shifted upward in the figure so as to increase the opening of the throttling valve seat 9 thereby increasing the flow of exhaust gases recirculated. By contrast, if the actual value of the fluid pressure detected by the pressure sensor 24 is larger than the read-out target value (this means that the absolute value of the difference from atmospheric pressure of the actual fluid pressure is smaller than that of the target value) the control means 21 delivers an electrical output signal which operates the pressure control valve 16 so as to reduce the vacuum existing in the diaphragm chamber 14, i.e., to open the bleed port 19. In this case, the valve element 10 is shifted downward in the figure so as to reduce the effective opening of the throttling valve seat 9.

The abovementioned control operation in this embodiment is obtained by employing a difference amplifier for the comparison of the target value and the actual value of the fluid pressure and a hybrid control system combining analog control with digital control. On the other hand, such control can also be performed by a pure digital control system.

Figure 3:
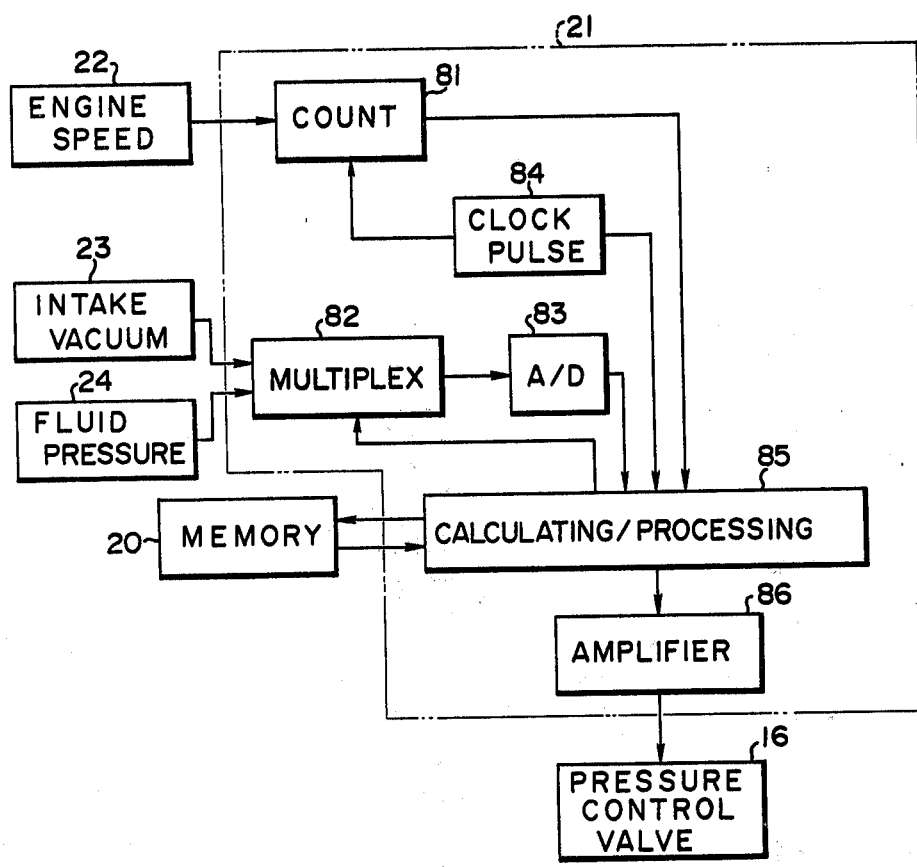
FIG. 3 is a block diagram of an embodiment of a digital type of the exhaust gas recirculation control system of the present invention.

In FIG. 3, an embodiment of a pure digital control system is shown by a block diagram. A counter circuit 81 counts the pulse signals delivered from the engine rotational speed sensor 22 in accordance with the time intervals determined by clock pulses delivered from a clock pulse generating circuit 84 and provides a pulse number which represents the current rotational speed of the engine. An analog multiplexer 82 deals with signals delivered from the intake manifold vacuum sensor 23 and the pressure sensor 24 detecting the fluid pressure supplied to the diaphragm chamber 14 in accordance with the instructions received from a calculating/processing means 85 in a time-chopping manner and delivers its output signal to an A/D converter 83. The calculating/processing means 85 reads out a particular target value for the fluid pressure from the memory means 20 depending upon the digital information with regard to the rotational speed and the intake manifold vacuum of the engine received from the counter 81 and the A/D converter. The digital information with regard to the actual fluid pressure, i.e. the amount of vacuum existing in the diaphragm chamber 14, generated from the output signal of the pressure sensor 24 through the analog multiplexer 82 and the A/D converter 83, is also supplied to the calculating/processing means 85 and is compared with the read-out target value in synchronization with the clock signal delivered from the clock pulse generating circuit 84. The calculating/processing means 85 produces a binary logic output, either "1" or "0", in accordance with the difference between the actual value of said fluid pressure and its target value, said logic output being delivered to an amplifier 86 which produces a corresponding ON/OFF electric output signal for operating the pressure control valve 16.

Figure 4:
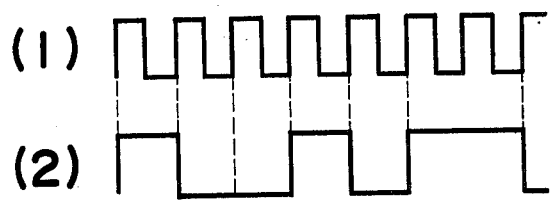
FIG. 4 shows the clock signal and the operation signal used in the system shown in FIG. 3.

FIG. 4 shows an example of the above-mentioned ON/OFF electric signal in relation to the clock signal. In this case the calculation for comparing the actual value and the target value of said fluid pressure is triggered by the build-up edge of the clock signal (1) and, in accordance with the logic output "1" or "0" thereby obtained, the operating signal (2) for the pressure control valve 16 is produced by electrical amplification of the logic output in the amplifier 86.

Figure 5:
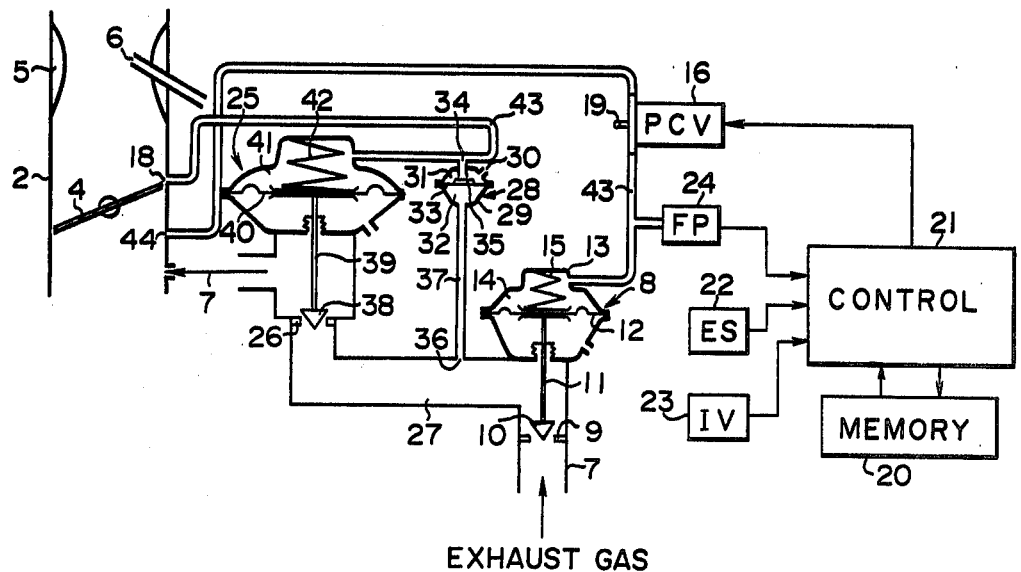
FIGS. 5 and 6 are diagrammatical illustrations showing two embodiments of the exhaust gas recirculation control system of the present invention modified to be of the back pressure control type.

FIG. 5 is a view similar to FIG. 1, showing an embodiment which incorporates the present invention in an exhaust gas recirculation system of a back pressure control type. In FIG. 5, the portions corresponding to those shown in FIG. 2 are designated by the same reference numerals as in FIG. 2. In this embodiment, a second diaphragm type exhaust gas recirculation control valve 25 is provided at a middle portion of the passage 7 downstream of the exhaust gas recirculation control valve 8 as seen in the direction of recirculating gas flow. The second control valve 25 includes a throttling valve port 26 which is provided at a middle portion of the passage 7 and is controlled by a valve element 38 supported by a rod 39 which in turn is supported by a diaphragm 40. Diaphragm 40 is biased downward in the figure by a compression coil spring 42 and is shifted upward in the figure by the vacuum supplied to a diaphragm chamber 41 defined on the upper side of the diaphragm 40. The diaphragm chamber 41 is connected to a vacuum take-out port 18 by a vacuum conduit 43.

A vacuum modulator 28 is provided to modify the intake manifold vacuum supplied to the diaphragm chamber 41. The vacuum modulator 28 comprises a casing 29 having a bleed port 30 which opens a valve chamber 31 connected with the conduit 43 via a valve port 34 to the atmosphere. The valve port 34 is controlled by a valve element 35 supported by a diaphragm 33 which is shifted up and down in the figure by the pressure existing in a diaphragm chamber 32 which is connected with an intermediate portion 27 of the passage 7 located between the two control valves 8 and 25, by a conduit 37 having a port end 36 opening to the passage portion 27.

In operation, if the pressure in the intermediate passage portion 27 lowers, the diaphragm 33 is shifted downward in the figure so as to open the valve port 34 thereby allowing atmospheric air to bleed into the vacuum conduit 43, whereby the vacuum supplied to the diaphragm chamber 41 is correspondingly reduced. Consequently, the valve element 38 is shifted downward in the figure so as to reduce the effective passage area of the throttling valve port 26. This has the effect of increasing the pressure in the intermediate passage portion 27. On the other hand, if the pressure in the intermediate passage portion 27 increases, the diaphragm 33 of the vacuum modulator 28 is shifted upward so as to close the valve port 34, thereby interrupting bleeding of atmospheric air into the vacuum conduit 43, whereby the vacuum supplied to the diaphragm chamber 41 increases. Consequently, the valve element 38 is shifted upward so as to increase the effective passage area of the throttling valve port 26. As is apparent, this has the effect of reducing the pressure in the intermediate passage portion 27. In this manner the second control valve 25 has the effect of maintaining a substantially constant pressure in the intermediate passage portion 27, i.e., a substantially constant back pressure for the throttling valve port 9 of the exhaust gas recirculation control valve 8. By controlling the back pressure of the exhaust gas recirculation control valve 8 to be substantially constant, particularly at atmospheric pressure the performance of the exhaust gas recirculation control system including the control valve 8, pressure control valve 16, vacuum conduit 17, memory means 20, control means 21, engine rotational speed sensor 22, intake vacuum sensor 23, and pressure sensor 24 is made substantially linear, wherein the exhaust gas recirculation ratio is substantially proportional to the opening area of the throttling valve seat 9, and high accuracy in operation is obtained over a wide range of operational conditions.

Figure 6:
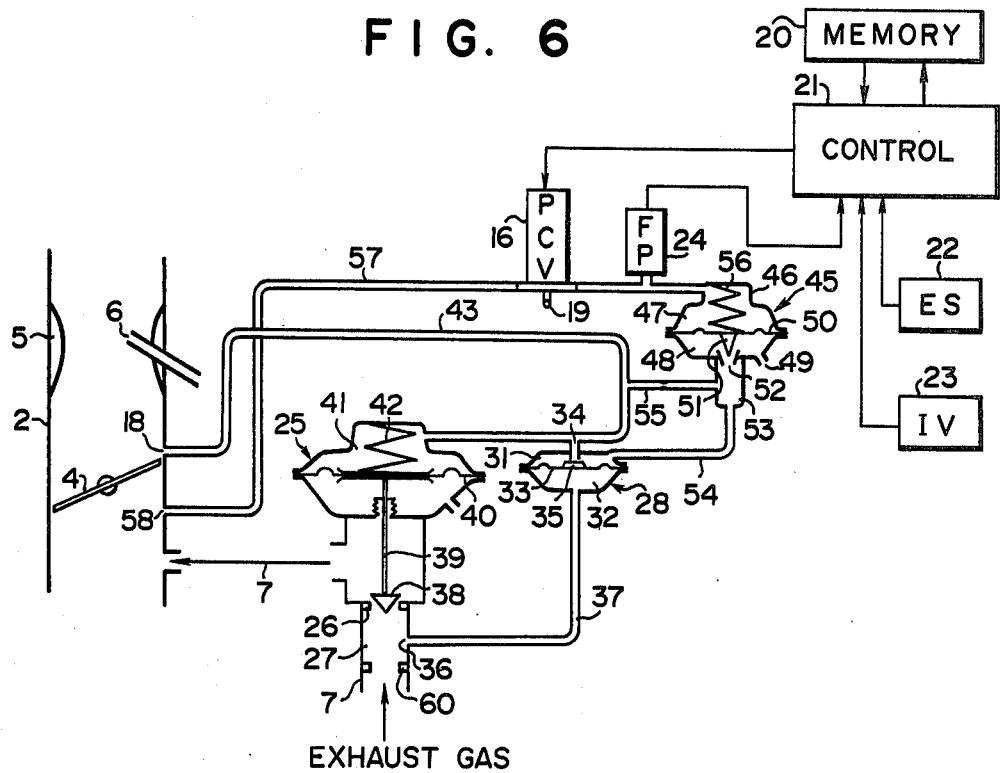

FIG. 6 is a view similar to FIGS. 2 and 5, showing another embodiment of the present invention in which the exhaust gas recirculation control system of the present invention operates as a back pressure control system incorporated in the passage for conducting exhaust gases to be recirculated. In FIG. 6, the portions corresponding to those shown in FIGS. 2 and 5 are designated by the same reference numerals as in FIGS. 2 and 5. In this system, the valve chamber 31 of the vacuum modulator 28 is opened to the atmosphere by way of a bleed control valve 45. Furthermore, the diaphragm 33 of the vacuum modulator 28 is shifted due to the balance between the vacuum existing in the valve chamber 31 and the pressure existing in the diaphragm chamber 32. Therefore, the balancing performance of the vacuum modulator 28 is varied by varying the bleeding operation of the bleed control valve 45 so as to maintain various constant pressure in the intermediate passage portion 27. As is well known in the art, by maintaining a constant pressure, particularly atmospheric pressure, in the intermediate passage portion 27, with a constant throttling orifice means 60 provided upstream thereof, a constant exhaust gas recirculation ratio is obtained. As is apparent from this, by varying the level of the pressure in the intermediate passage portion 27, the exhaust gas recirculation ratio may be correspondingly varied.

The bleed control valve 45 comprises a casing 46 having a bleed port 49, a diaphragm 50 which divides the internal space of the housing into a diaphragm chamber 47 and a valve chamber 48, a compression coil spring 56 which biases the diaphragm 50 downward in the figure, a valve element 51 supported by the diaphragm 50, a valve port 52 adapted to be controlled by the valve element 51 and a valve inlet chamber 53. The diaphragm chamber 47 is connected to a vacuum take-out port 58 by a vacuum conduit 57. The fluid pressure or vacuum supplied to the diaphragm chamber 47 is controlled by the pressure control valve 16 associated with the control elements 20, 21, 22, 23, and 24, in the same manner as the fluid pressure or vacuum supplied to the diaphragm chambers 14 in the embodiment shown in FIGS. 2 and 5. In view of the foregoing explanation made of the embodiments shown in FIGS. 2 and 5, it will be apparent that, in the system shown in FIG. 6, the fluid pressure supplied to the diaphragm chamber 47 is controlled so as to accord with a particular target value for said pressure read out by the control means 21 from the memory means 20 in accordance with the current operational condition of the engine as detected by the sensors 22 and 23 thereby effecting a particular bleeding condition in the bleed control valve 45 so as to effect a particular balancing condition of the diaphragm 33 of the vacuum modulator 28 which effects a particular modulation of the intake manifold vacuum supplied to the diaphragm chamber 41 of the exhaust gas recirculation control valve 25 so as to establish a particular constant level of the pressure in the intermediate passage portion 27. The valve inlet chamber 53 is connected with the passage 43 by means of a throttled bleed passage 55 to avoid vacuum locking of the passage 54.

Figure 7:
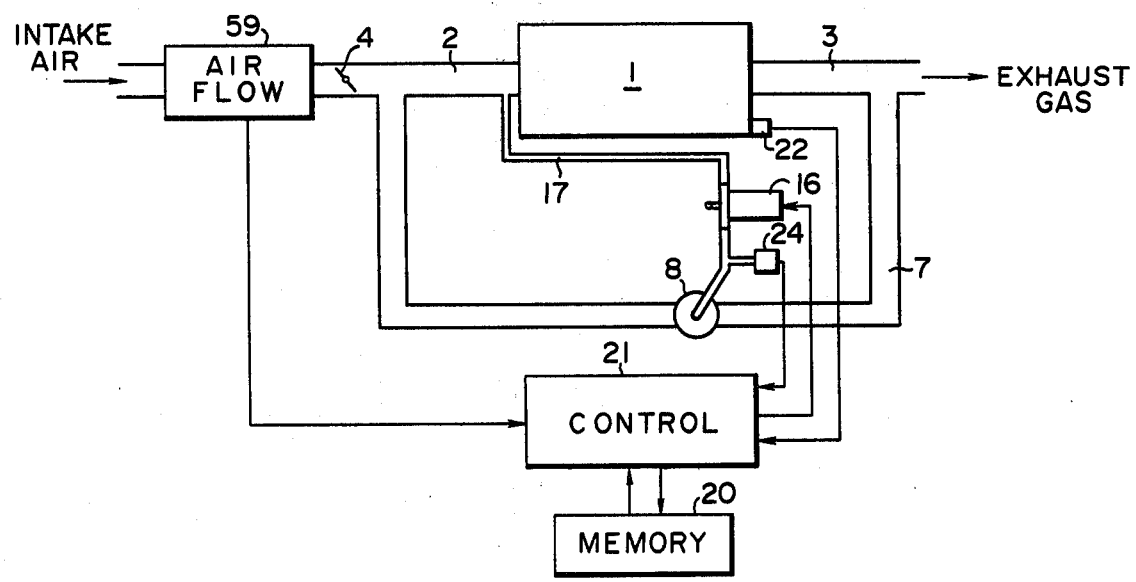
FIG. 7 is a diagram similar to FIG. 1, showing another embodiment of the present invention.

FIG. 7 is a view similar to FIG. 1 showing another embodiment of the present invention. In FIG. 7 the portions corresponding to those shown in FIG. 1 are designated by the same reference numerals as in FIG. 1. In the embodiment shown in FIG. 7, the operating condition of the engine is expressed by the combination of the rotational speed and the amount of intake air of the engine. Therefore, instead of the intake manifold vacuum sensor 23 employed in the system shown in FIG. 1, a sensor 59 for detecting the amount of intake air flow is provided at a middle portion of the intake air passage of the engine. From the comparison of FIGS. 1 and 7 and in view of the foregoing explanation, particularly with regard to FIGS. 1–4, the operation of the system shown in FIG. 7 will be obvious without any further detailed explanation.

Although the invention has been shown and described with respect to some preferred embodiments thereof, it should be understood by those skilled in the art that various changes and omissions from the form and detail thereof can be made therein without departing from the scope of the invention.

We claim:

1. An exhaust gas recirculation control system for an internal combustion engine, comprising a passage for conducting exhaust gases to be recirculated, a diaphragm type exhaust gas recirculation control valve having a diaphragm chamber and controlling said passage in accordance with the fluid pressure supplied to said diaphragm chamber, a pressure control valve for controlling said fluid pressure, a pressure sensor for detecting said fluid pressure, a memory means for retaining target values for said fluid pressure which provide the optimum exhaust gas recirculation in various operating conditions of the engine, said operating conditions of the engine being expressed by the combination of two quantities selected from the rotational speed, amount of intake air, and intake manifold vacuum of the engine, means for detecting current values of said two selected quantities, and a control means which reads out a particular target value for said fluid pressure from said memory means in accordance with the current values of said two selected quantities, compares the read-out target value with the value of said fluid pressure detected by said pressure sensor, and controls said pressure control valve so as to accord said fluid pressure to the read-out target value.

2. The control system of claim 1, wherein said two selected quantities are the rotational speed and the intake manifold vacuum of the engine.

3. The control system of claim 1, wherein said control means includes means for converting analog values to digital values and a digital calculating/processing means so as to produce an ON/OFF electric signal for operating said pressure control valve while said pressure control valve is an electromagnetic control valve.

4. The control system of claim 1, further comprising a back pressure control means incorporated at a middle portion of said passage downstream of said exhaust gas recirculation control valve, said back pressure control means being adapted to maintain a substantially control pressure in the intermediate passage portion located between said exhaust gas recirculation control valve and said back pressure control means.

5. The control system of claim 4, wherein said back pressure control means is a diaphragm type control valve having a diaphragm chamber and controlling said passage, a manifold vacuum take-out port, a vacuum conduit for connecting said diaphragm chamber of said back pressure control means to said manifold vacuum take-out port, and a vacuum modulator for selectively bleeding atmospheric air into said vacuum conduit in accordance with the pressure existing in said intermediate passage portion.

6. The control system of claim 5, wherein said two selected quantities are the rotational speed and the intake manifold vacuum of the engine.

7. An exhaust gas recirculation control system for an internal combustion engien, comprising a passage for conducting exhaust gases to be recirculated, a diaphragm type exhaust gas recirculation control valve having a diaphragm chamber and controlling said passage in accordance with the intake manifold vacuum supplied to said diaphragm chamber, a throttling means provided in said passage upstream of said exhaust gas recirculation control valve as seen in the direction of recirculating gas flow, a vacuum modulator for modulating said intake manifold vacuum supplied to said diaphragm chamber by selective atmospheric air bleeding, said vacuum modulator having a valve chamber through which said atmospheric air bleeding is effected and a diaphragm chamber connected to said passage at a portion located between said exhaust gas recirculation control valve and said throttling means and controlling said atmospheric air bleeding in accordance with the balance between the fluid pressures existing in said valve chamber and said diaphragm chamber connected to said intermediate passage portion, a bleed controlling valve having a diaphragm chamber and controlling atmospheric air bleeding to said valve chamber of said vacuum modulator in accordance with the fluid pressure supplied to said diaphragm chamber of said bleed controlling valve, a pressure control valve for controlling said fluid pressure, a pressure sensor for detecting said fluid pressure, a memory means for retaining target values for said fluid pressure which provide the optimum exhaust gas recirculation in various operating conditions of the engine, said operating conditions of the engine being expressed by the combination of two quantities selected from the rotational speed, amount of intake air and intake manifold vacuum of the engine, means for detecting current values of said two selected quantities, and a control means which reads out a particular target value for said fluid pressure from said memory means in accordance with the current values of said two selected quantities, compares the read-out target value with the value of said fluid pressure detected by said pressure sensor, and controls said pressure control valve so as to accord said fluid pressure to the read-out target value.

8. The control system of claim 7, wherein said two selected quantities are the rotational speed and the intake manifold vacuum of the engine.

9. The control system of claim 1, wherein said two selected quantities are the rotational speed and the amount of intake air of the engine.

* * * * *